Patented July 24, 1928.

1,678,476

UNITED STATES PATENT OFFICE.

CHARLES E. NORTH, OF MONTCLAIR, NEW JERSEY, ASSIGNOR TO THE MILK OIL CORPORATION, OF WILMINGTON, DELAWARE, A CORPORATION OF DELAWARE.

PRODUCING AGGLOMERATED CREAM.

No Drawing. Application filed February 20, 1924, Serial No. 694,015. Renewed June 8, 1928.

It is well known that a suitable agitation not too prolonged and sufficiently violent will convert cream from the condition of a liquid to that of a frothing or fluffy mass which is commonly known as whipped cream. This change in character is a purely physical one and results from the combined action or effect of several operations. For example, agitating or whipping by the action of any suitable mechanical contrivance impels the fat globules into engagement with one another, with the result that they unite or stick together. The process is progressive, the fat globules, normally independent in the emulsion, gradually agglomerating into small clusters which in turn unite to form larger groups or clusters until, if the agitation be prolonged, large masses of fat are formed, in the end all of the fat coalescing as happens in butter making.

This adherence of the fat globules under the influence of agitation is very greatly influenced by the percentage of fat in the cream and by the temperature under which the agitation occurs. Experiment has shown that a fat percentage of about 35, and a temperature of 55°, are the conditions best adapted to a rapid and efficient whipping of the cream.

Another factor in the whipping of cream has to do with the effect of the agitation on the skim milk or the milk serum in which the fat globules are suspended to form the emulsion. This serum, since it contains solids other than fat, has a greater viscosity than pure water and has the property of absorbing and retaining a relatively large percentage of air, which, by the agitation, is incorporated in the serum as small bubbles forming a froth or suds, and from this it results that when a given quantity of cream is whipped it may expand in volume as much as 100%.

For the reason that this characteristic condition of whipped cream is the result of the incorporation with the milk serum of countless bubbles of air, its production in this form is dependent upon the presence of air during the agitation, and consequently cream is always whipped in open vessels. Under the microscope such cream will be found to have undergone a physical change in that the fat globules have, to a greater or lesser extent, agglomerated with the formation of a mesh or sponge like structure, within the cells or confining walls of which are both droplets or pools of milk serum, as well as bubbles of air.

I have discovered that if before being whipped, the cream be thoroughly washed or freed of substantially all solids not fat, the presence of which in cream in its natural or normal state accounts for its conversion, when whipped, into a frothy or fluffy mass of greater volume, that an entirely new product results. In other words, if the cream be washed before being whipped, the agglomeration of the fat globules into the same meshes or sponge like structure occurs, but within this mass, while the confined pools of milk serum exist, there are no confined bubbles of air.

My improved product, i. e., whipped washed cream is not a froth, but a substance which is more in the nature of a solid than a liquid. It is much thicker and tougher than ordinary whipped cream, free from froth or bubbles, and is not expanded or swollen above the volume of the original cream. It shows no evidence of free moisture or free milk serum, and has the consistency of a thick paste or gum. It may be made so stiff that it will not pour or run, but will adhere to the vessel in which it was prepared so that it can only be removed by a spoon or similar implement, like partly frozen ice cream. It may be handled in large masses and broken up into smaller masses.

In practicing this invention I select a cream having a fat content of about 35%. To such cream I add about ten volumes of clean water and pass the mixture through an ordinary cream separator. The product is again mixed once, or, if found desirable or necessary, twice with ten volumes of clean water and again passed through a cream separator, with the result that it is thoroughly washed and freed of substantially all solids not fat. This washed cream is chilled to a temperature of about 55° F., and then passed through any proper machine such as has heretofore been employed for whipping natural cream, whereupon it is rapidly converted into the pasty mass above described.

I have found that bringing the cream to this condition requires no essentially different form of apparatus and no greater period of time or amount of agitation than is necessary for whipping unwashed cream, or that from which the solids not fat have not been removed prior to its being whipped. In fact I have observed that the time required to bring it to this condition is even less than that required to whip natural cream.

Cream in this form I believe to be a new product. As a result of the agitation the fat particles are agglomerated in a mesh or sponge which holds within itself all of the remanent milk serum but so that no free fluid appears. It may properly be defined as agglomerated cream.

While this substance may be capable of many uses, the special use to which I apply it is in the production of oil from milk. In other patents and applications I have set forth the processes which I employ for this purpose, but for the present it is sufficient to say that I treat this product in the same way that I have heretofore treated the ordinary whipped cream. That is to say, I add to it a relatively large volume of hot water and permit the mixture to stand until the fat rises to the surface as a layer of oil. This oil I free from moisture by passing it through an oil separator or otherwise. This agglomerated cream I have found to be better suited to these and the other steps in my process than ordinary whipped cream. Air bubbles or suds do not contribute to the efficiency of the separation of the oil, but actually constitute an interference.

I do not undertake to explain the reason for this remarkable result. My theory originally was that it resulted from the whipping of the cream in a practical vacuum or in a vessel from which the air was excluded, but after most extended practical application of the process, and under conditions where there was no attempt to exclude air from the cream while undergoing whipping, it became manifest that this theory was untenable. I believe that by washing the cream the viscosity of the milk serum, which contains the solids not fat, is so far reduced that it becomes incapable of confining air bubbles in the spongy mass to which the cream is reduced. My improved product is markedly different from whipped cream produced from unwashed cream, and so far as I know no one has ever recognized that any new result could or would be arrived at in whipping a washed rather than a natural cream.

What I claim is:

1. The process herein set forth of producing an agglomerated cream which consists in washing natural cream to remove therefrom substantially all solids not fat and whipping the washed cream without substantially increasing the volume of the washed cream.

2. The new milk product herein described, agitated and agglomerated cream in a stiff pasty mass substantially free from all solids not fat and containing substantially no added air.

3. The process herein set forth of producing an agglomerated cream which consists in washing natural cream to remove therefrom substantially all solids not fat and whipping the washed cream until it has the consistency of a stiff paste without substantially increasing the amount of air contained in the cream before whipping.

4. The new milk product herein described, agitated and agglomerated cream in a stiff pasty mass substantially free from all solids not fat and without substantial increase in the volume of the cream before its agitation and agglomeration and containing substantially no free milk serum.

In testimony whereof I hereto affix my signature.

CHARLES E. NORTH.